May 26, 1925.

C. H. COLLINS ET AL 1,539,715

END BRACKET FOR AXMINSTER TUBE FRAMES

Filed Nov. 21, 1923

INVENTORS.

Charles H. Collins & Howard Mason

BY Ernest D. Jansen

ATTORNEY.

Patented May 26, 1925.

1,539,715

UNITED STATES PATENT OFFICE.

CHARLES H. COLLINS, OF AMSTERDAM, NEW YORK, AND HOWARD MASON, OF SAXONVILLE, MASSACHUSETTS.

END BRACKET FOR AXMINSTER TUBE FRAMES.

Application filed November 21, 1923. Serial No. 676,133.

*To all whom it may concern:*

Be it known that we, CHARLES H. COLLINS and HOWARD MASON, citizens of the United States, residing, respectively, at Amsterdam, county of Montgomery, State of New York, and Saxonville, county of Framingham, State of Massachusetts, have invented certain new and useful Improvements in End Brackets for Axminster Tube Frames, of which the following is a specification.

This invention relates to tube frames for Axminster looms, and the object of this invention is to improve the frame-carrying chain engaging end brackets thereof.

While the tube frames of an Axminster loom are in place on the frame-carrying chain thereof, the chain engaging end brackets are subjected to a variety of torsional strains, as is well understood by those familiar with the working of Axminster looms which make use of tube frames to insert the tuft yarns between the warp yarns.

At times the whole weight of the tube frame is carried by the yielding or spring members which form a part of the end brackets, at times by the bracket arms proper, and at other times a part of the strain is carried by each. In the usual end bracket, this spring member is fastened near its lower end to the bracket arm proper by means of a single screw passing therethrough and screwed into the bracket arm or other convenient anchorage. The upper end of the spring member passes through an opening in the offset portion of the bracket arm proper, and is locked against more than a limited turning motion about the holding screw, by the sides of the opening through which it passes. In a few of the tube frames now in use two fastening screws are employed in place of the usual single screw, but the use of two screws decreases the effectiveness of the spring member by shortening the length of the active spring portion.

When only a single screw is used to fasten the spring to the bracket arm, as is most generally the case, it is almost impossible to prevent the sides of the spring member from at times contacting with the sides of the opening through the bracket arm proper and so preventing the desired free action of the spring member. There is also a great deal of trouble caused by the loosening of the screws which fasten the spring member in place. The method in which we overcome the troubles due to the turning of the spring member about the fastening point, and greatly strengthen the end bracket without materially changing the general shape and dimensions thereof, as well as other improvements, are illustrated in the accompanying drawings, in which:

The same reference characters refer to the same parts throughout the several views.

Figures 1, 2, 3:
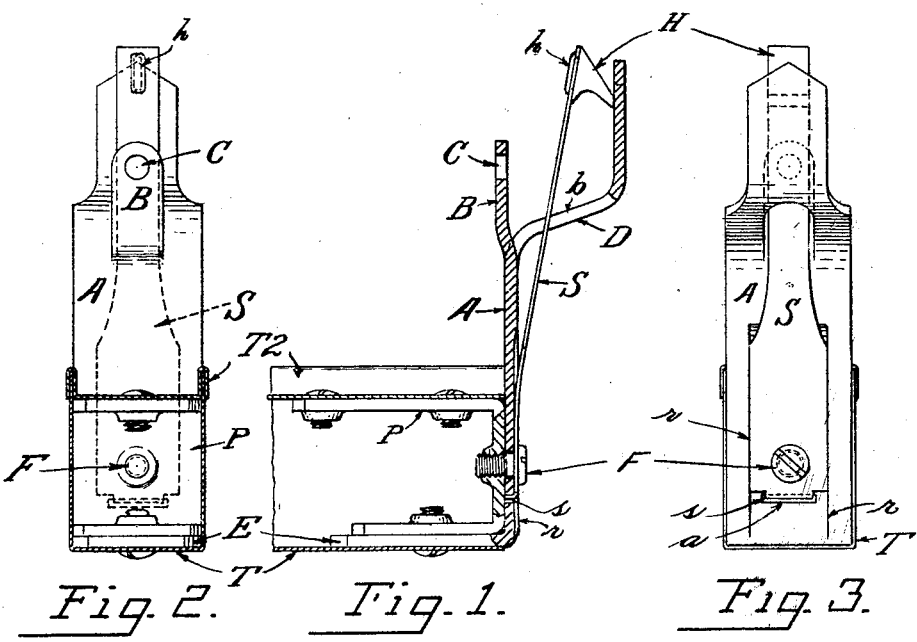
Fig. 1 is a side elevation, partly in section, of our improved end bracket in place in the end of a tube bar.
Figs. 2 and 3 are end elevations of Fig. 1.
Figures 4, 5:
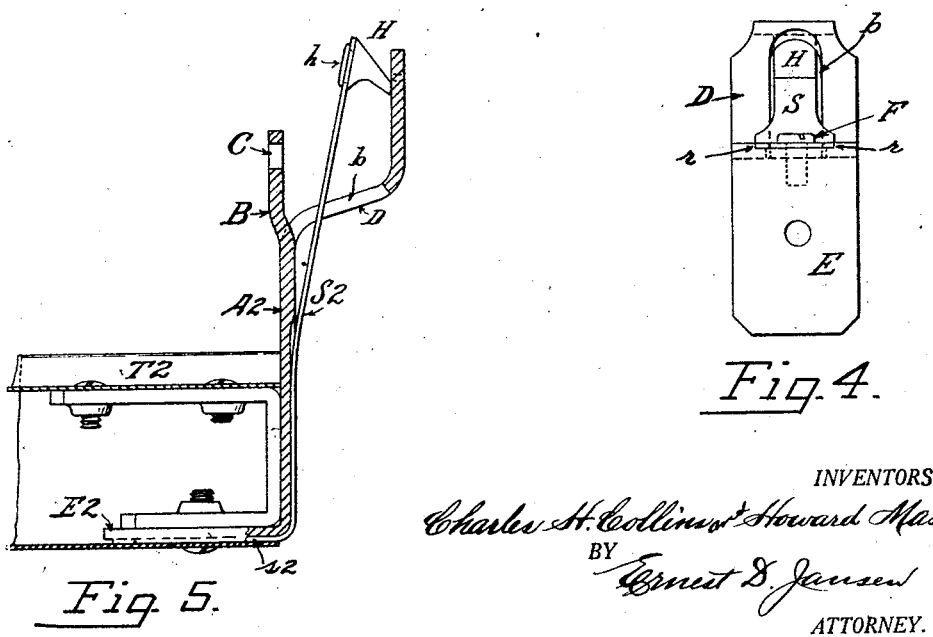
Fig. 4 is a bottom view of our improved bracket.
Fig. 5 is a side elevation of our improved end bracket, illustrating a modified form thereof.

Referring to the drawings, which are in a certain sense illustrative only, it will be plainly seen that our improved end bracket comprises a bracket arm proper A, out of which is punched a tongue B, in which is an opening C, adapted to act as a bearing for a tuft yarn spool, the upper end of the bracket arm being offset at D, all in substantially the usual manner. In the drawings, we have shown the lower end of the bracket arm as being bent at right angles to form a side projecting rib or tongue E, adapted to be inserted in an opening in the tube bar T, so as to hold the bracket in place and resist upward strains. Many modifications in the method of attachment between the end bracket and tube bar may be employed without departing from the spirit of our invention. One such modification is illustrated in Fig. 5, in which the tongue $s^2$, is shown as projecting under the lower end of the bracket arm proper and into the socket or space which is adapted to receive the tongue $E^2$. This method makes possible the omission of the fastening screw F. If the screw F is used the offset flange $s^2$ need only be long enough to hook under the bottom of the bracket $A^2$ so as to be in position to resist upward strain exerted on the member $S^2$.

Our improvements lie in the manner in which we attach the spring member S, to the bracket arm A, so as to relieve the fastening screw F, from all strains other than the pull against the head, due to the flexing of the spring member S; and in fastening a hook member H, to a substantially flat spring member instead of forming the hook in the spring member itself, as is the usual course.

For the purpose of relieving the fastening screw from torsional strains and the strain due to the weight of the tube frames, we form in the bracket A, a slotted opening or depression, $a$, and bend the lower end of the spring so as to form a projection, hook, or rib, $s$, adapted to enter said depression or opening so as to bear the weight of the tube frame when such weight is being carried through the spring S, and hook H. To relieve the fastening screw from the usual torsional strain and hold the spring S, central in the opening, $b$, so as to prevent the spring from dragging on the sides thereof, we form a pair of ribs or shoulders, $r, r$, between which the lower portion of the spring S, is adapted to fit with sufficient closeness. We have shown these ribs or shoulders as having been formed by milling out a groove the proper width to receive the spring, but they may be made by pressing the metal into the desired shape. A number of bosses may be substituted for the ribs if so desired.

Much trouble results from the breaking of the hook ends of the spring members when the hooks are formed in the springs themselves, and to eliminate this trouble we make a hook H, with a rib-like projection, $h$, on the back thereof, adapted to enter and be riveted in a slotted opening formed in the upper end of the flat spring member S.

What we claim as our invention and desire to secure by Letters Patent is:

1. In a frame carrying chain engaging end bracket for an Axminster tube frame, the combination of a spring member made from flat spring material and having a hook on its upper end and a side projecting flange on its lower end; and a bracket arm, the upper end offset outwardly and having an opening therein adapted to pass said spring member, the lower end provided with a recess adapted to receive said flange, and shoulders formed in said bracket arm and adapted to contact with the edges of said spring member and prevent sidewise displacement thereof.

2. In a frame carrying chain engaging end bracket for an Axminster tube frame, the combination of a spring member having a formed block of metal attached to the upper end thereof and a side projecting flange formed on the lower end thereof; and a bracket arm, the upper end offset outwardly and having an opening therein adapted to pass said spring member, the lower end provided with a recess adapted to receive said flange, and shoulders formed on said bracket arm and adapted to contact with the edges of and prevent sidewise displacement of said spring member.

3. A bracket arm adapted to be fastened to the end of the tube bar of a tube frame for an Axminster loom and having spaced projections formed on the face thereof adapted to prevent sidewise movement of a spring chain-engaging hook member attached to the face of said bracket arm between said projections.

4. In an end bracket for a tube frame for an Axminster loom, a bracket arm adapted to be fastened to the end of the tube bar of said frame and having projections spaced apart on the face thereof; a spring chain-engaging hook member, the lower portion thereof fitting snugly between said spaced projections, the lower end thereof provided with an offset flange adapted to contact with a shoulder formed on said bracket arm so as to resist upward strains applied to said spring member.

5. In a frame-carrying chain-engaging end bracket for an Axminster tube frame; the combination of a chain-engaging hook, comprising a piece of flat spring material, a hook formed from a solid block of metal, said hook being securely attached to the upper end of said flat spring material so as to form a hook like end thereon; a bracket arm the upper end thereof offset outwardly and having an opening therein adapted to pass said spring member, the lower end of said bracket member adapted to be fastened to the tube bar of a tube frame, the lower end of said spring member fastened against said bracket member.

6. In a chain-engaging hook member for an end bracket for an Axminster tube frame, the combination of a piece of flat spring material and a formed block of metal securely attached to one end thereof so as to form a hook-like end thereon.

In testimony whereof we have affixed our signatures.

CHARLES H. COLLINS.
HOWARD MASON.